No. 732,487. PATENTED JUNE 30, 1903.
H. WISCHERMANN & J. KOLSCH.
HOSE COUPLING.
APPLICATION FILED MAR. 12, 1903.
NO MODEL.
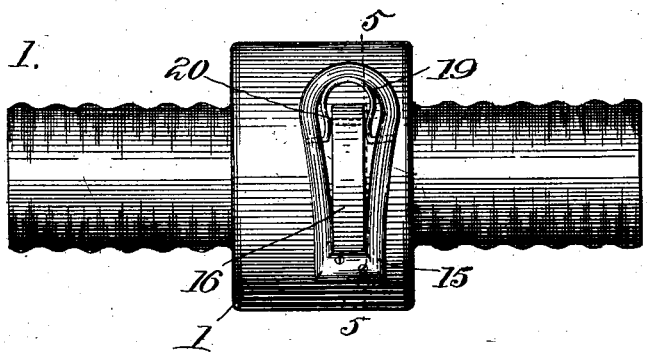
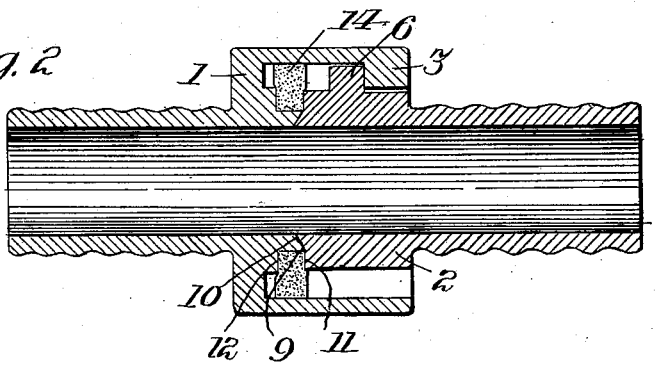
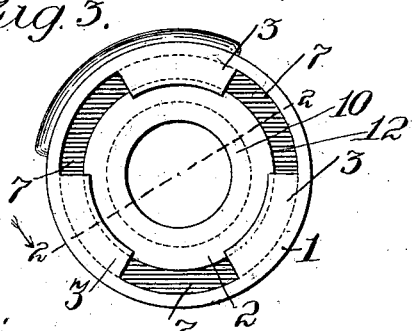
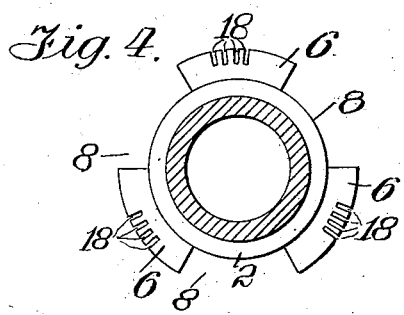
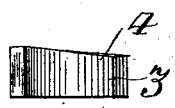
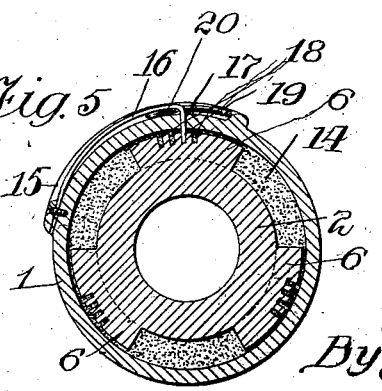
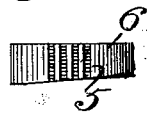
Witnesses:
Inventors
H. Wischermann
J. Kolsch
By their Attorneys
THE NORRIS PETERS CO., PHOTO-LITHO., WASHINGTON, D. C.

No. 732,487.

Patented June 30, 1903.

UNITED STATES PATENT OFFICE.

HENRY WISCHERMANN AND JOHN KOLSCH, OF DONORA, PENNSYLVANIA.

HOSE-COUPLING.

SPECIFICATION forming part of Letters Patent No. 732,487, dated June 30, 1903.

Application filed March 12, 1903. Serial No. 147,420. (No model.)

*To all whom it may concern:*

Be it known that we, HENRY WISCHERMANN and JOHN KOLSCH, citizens of the United States of America, residing at Donora, in the county of Washington and State of Pennsylvania, have invented certain new and useful Improvements in Hose-Couplings, of which the following is a specification, reference being had therein to the accompanying drawings.

This invention relates to certain new and useful improvements in hose-couplings, and more particularly to that class of couplings which are adapted to be connected without the use of threads or nuts.

The object of this invention is to provide means whereby two sections of hose may be joined and a water-tight connection formed therebetween and also to provide means whereby when the same have been joined they will be securely held in their joined position until released by actuating suitable means.

In describing the invention in detail reference is had to the accompanying drawings, forming a part of this application, and wherein like numerals of reference indicate like parts throughout the several views, in which—

Figure 1 is an elevation of our improved hose-coupling looking toward the securing-latch, the hose being removed from said coupling. Fig. 2 is a section on the line 2 2 of Fig. 3 looking in the direction of the arrow. Fig. 3 is a view looking toward the face of the female section, a rubber gasket being removed. Fig. 4 is an end view of the male section, the hose connection being shown in section. Fig. 5 is a section on the line 5 5 of Fig. 1, showing the method of locking the male and female members together. Fig. 6 is a view of one of the inclined lugs carried by the female section. Fig. 7 is a plan view of one of the lugs carried by the male member.

The reference-numeral 1 indicates the female member of our improved coupling, and the same is formed in a barrel shape. The male member 2 is adapted to be inserted into this female member, and the lugs 3 3 3, carried by or formed integral with the female member, have beveled faces 4, which are adapted to be engaged by the beveled faces 5, formed on the lugs 6 6 6, which are carried by or formed integral with the male member 2. Formed between the lugs 3 3 3 are the spaces 7 7 7 to permit the lugs 6 6 6 to be inserted, and between the lugs 6 6 6 are the spaces 8 8 8, formed to permit a similar insertion of the lugs 3 3 3. The inner or connecting end of the male portion is formed on an angle, as shown at 9, which engages the correspondingly-cut angle 10 on the female member, and the shoulder 11 on the male member and 12 on the female member are constructed to permit the rubber gasket 14 to be inserted and compressed between said shoulders when the two members of the coupling are connected. Formed on the outside of the female member 1 is a raised portion 15, which is of a horseshoe shape, and secured in the lower narrow portion thereof by screws or any suitable means is a spring 16, which conforms in shape to the periphery of the outside of the female portion and which has its free ends formed in the shape of a hook 17, which passes through a suitable opening in the female portion and engages some one of the slots 18, cut in the lugs 6 of the male portion. By this means when the male member has been inserted in the female member and the parts have been given a partial rotation relative to each other the beveled faces 4 5 passing over each other will compress the rubber until such time as the annular seats 10 and 12 shall have come in contact. The rubber gasket 14 will have then been compressed and form an absolutely tight joint, and the spring-lock 16 will fall into one of the notches 18 and secure the parts in this position until such time as the release-loop 19, which is pivoted in the part 15, shall have been raised, when the cross-piece 20, running from side to side of the loop and under spring-lock 16, will withdraw the hook 17 from the notches 18, thereby permitting the partial rotation and removal of the two parts. The loop 19 is so constructed that it lies within the surface of the part 15, thereby not exposing any of the movable parts.

It will be observed that various changes may be made in the details of construction without departing from the general spirit of our invention.

Having fully described our invention, what we claim as new, and desire to secure by Letters Patent, is—

1. In a hose-coupling, the combination of male and female portions, said female portion having a plurality of lugs, the inner faces of which are formed on inclines, the male member having a plurality of lugs, the outer faces of which are formed on inclines, the abutting portions of said male and female parts being formed on an angle and said parts being provided with shoulders between which the rubber gasket is inserted, the said lugs on the male and female members being adapted to compress the said gasket when the parts are rotated relative to each other in one direction, and a spring-latch engaging notches cut in the lugs of the male portion, and means whereby said spring-latch may be removed from the same to permit the separation of the parts.

2. In a hose-coupler, an enlarged portion provided on its ends with a plurality of lugs having inclined faces, a bevel-seat, and a shoulder being formed on the inside of said enlarged portion, of a part adapted to be inserted in said enlarged portion and having a plurality of lugs provided with inclined faces adapted to engage the inclined faces of the lugs formed on said enlarged portion, said part being also provided with an angular seat adapted to contact with the inclined seat of the first-mentioned part and also provided with a shoulder and a rubber gasket arranged between said last-named shoulder and the shoulder formed in the first-mentioned part, and a spring-latch provided on the outside of the first-mentioned part, the latch end of which passes through a suitable aperture and engages one of the notches in the lugs, said latch being adapted to be removed by the actuation of the eccentrically-mounted release-loop, substantially as described.

In testimony whereof we affix our signatures in the presence of two witnesses.

HENRY WISCHERMANN.
JOHN KOLSCH.

Witnesses:
THEODORE HERRINGS,
FRED HALBERT.